United States Patent Office 3,281,727
Patented Oct. 25, 1966

3,281,727
TRAVELING WAVE HIGH POWER SIMULATION
Kenneth E. Niebuhr, Rockville, Md., and Kenneth G. Eakin, deceased, late of Northfield, N.J., by Margaret B. Eakin, executrix, Perth Amboy, N.J., assignors to the United States of America as represented by the Secretary of the Air Force
Filed May 12, 1964, Ser. No. 367,293
3 Claims. (Cl. 333—83)

The invention described herein may be manufactured and used by or for the United States Government for governmental purposes without payment to us of any royalty thereon.

This invention relates to traveling wave resonators and more particularly to a method and apparatus for generating high power densities of coherent R-F energy.

A traveling wave resonator has utility in military and industrial research and development laboratories to generate high power densities suitable for determining the effects of high power, particularly power-handling capability, upon materials and devices including transmission line components. Prior art devices such as a traveling wave resonator in the form of a closed transmission line system, frequently referred to as a resonator ring high power simulator, have a restricted usefulness. Specimens to be tested must either be positioned within the transmission line loop or made a part of said loop. Therefore, the ultimate power density achievable in a prior art device of this type is definitely limited by the losses incurred as the traveling wave circulates around the transmission line loop. The loss due to the specimen is a part of said loop loss. Furthermore, the size and shape of the specimen to be tested are restricted by the dimensions of the transmission line.

It is therefore, a principal object of this invention to provide a method and apparatus for a R-F high power simulator which will generate coherent R-F high power densities in a free-space environment.

It is another object of this invention to provide a R-F high power simulator which will generate coherent high power densities from a relatively low power density, coherent R-F source.

It is still another object of this invention to provide a R-F high power simulator which will generate coherent R-F power densities of a larger magnitude in such a way that the particular loss, size, and shape of the specimen is not unduly critical nor highly restricted.

It is a further object of this invention to provide R-F high power simulator apparatus which will generate high generate high power densities in the form of a coherent R-F traveling wave.

A still further object of this invention is to provide R-F high power simulator apparatus which is of simple construction and is inexpensive.

In carrying out the above objects, the instant invention comprehends the utilization of a pair of antennas and an exciting mechanism coacting to provide performance characteristics possessed by a closed transmission line high power simulator while allowing one to test specimens much less restrictive in both size and shape in an open environment.

The invention itself, both as to its organization and manner of operation, together with further objects and advantages thereof, may be best understood by reference to the following description taken in connection with the accompanying drawings in which.

Figure 1:
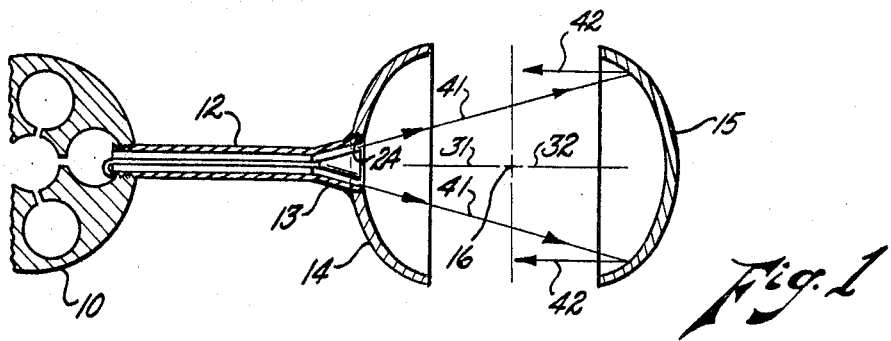
FIG. 1 illustrates a preferred embodiment of this invention.

Now referring to FIG. 1, a coherent R-F power source 10, whose power output level and frequency can be controlled, supplies coherent R-F power to primary feed element 13 via R-F transmission line 12. Paraboloid 14 has a hole centered at its vertex 24 which hole is large enough to allow feed element 13 to protrude into the space between paraboloids 14 and 15 (or allow energy radiated by feed 13 to pass into the region between said paraboloids if said feed aperture is located behind paraboloid 14). As indicated by the rays in FIG. 1, a large fraction of the energy from source 11 will be radiated by said feed and thence incident upon paraboloid 15. A fraction of this power, ray 41, incident upon paraboloidal reflector 15 will be reflected as a plane or nearly plane wave 42.

Figure 2:
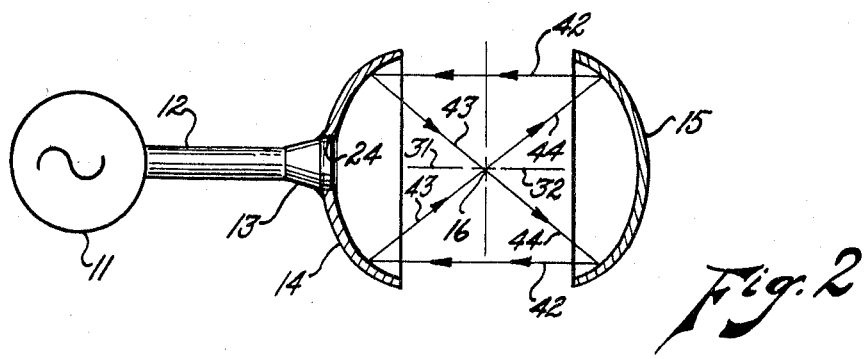
FIG. 2 is a layout view useful in explaining this invention.

Now referring to FIG. 2, the energy reflected from paraboloid 15 is intercepted by paraboloid 14 and reflected as spherically converging electromagnetic wave 43 which passes through common focal point 16, and thence becomes spherically diverging wave 44. Paraboloid 15 will intercept essentially all of this spherically diverging wave and reflect it as a plane wave 42 again, and the process is repeated.

The mode of operation described for FIG. 2 involves the excitation and maintenance of a steady state mode in which the R-F power passes from paraboloid 15 to paraboloid 14 as a plane wave and from paraboloid 14 to paraboloid 15 as a spherical wave. It is further to be noted that additional power is continuously being supplied by a conventional coherent R-F source 11 via transmission line 12 and primary feed element 13 so that constructive addition will occur between the power already in the steady state mode and power being added to the system if the sum of said paraboloid reflector focal lengths (as measured from the vertex to the focal point of each paraboloid) is exactly or very nearly equal to an integral number of R-F half wavelengths of the operating frequency.

That is to say, if the sum of the paraboloid focal lengths is an integrated number of half-wavelengths of the R-F signal the energy reradiated by paraboloid 14 will be in proper phase coherence with energy from primary radiator 13 so that constructive phase interference will occur. Thus energy is built up between paraboloids 14 and 15 in the form of a traveling wave as the process is continued. It is only necessary that primary R-F source 11 supply more than enough power to make up for losses in the system.

The primary cause of apparent system loss is that paraboloid 15 is only able to capture a certain fraction of the energy incident from primary radiator 13. However, with proper choice of parameters the paraboloid can capture 90% or more of the energy incident from the primary radiator. Additional loss of lesser magnitude are due to the energy reradiated from one paraboloid and not captured by the other paraboloid, and incoherent scattering of energy from the hole in paraboloid 14.

System losses are minimized by the following three design restrictions: (1) paraboloids 14 and 15 must not be placed too far apart (maintaining the sum of the paraboloid focal lengths to length $D2/\lambda$ where D is the diameter of the larger of the two paraboloids and $\lambda$ is the R-F wavelength is satisfactory); (2) the paraboloids should be approximately the same in diameter; (3) the paraboloid focal length to diameter ratios should be approximately the same.

It is evident that the above-described arrangement accomplishes the principal object of the invention in that a test specimen placed in a free-space environment between the two similar, electrically large, axially-facing paraboloidal reflectors 14 and 15, will be subjected to high R-F power densities due to the electromagnetic wave circulating in the region. The region of highest power densities will be in the vicinity of common focal point 16.

Figure 3:
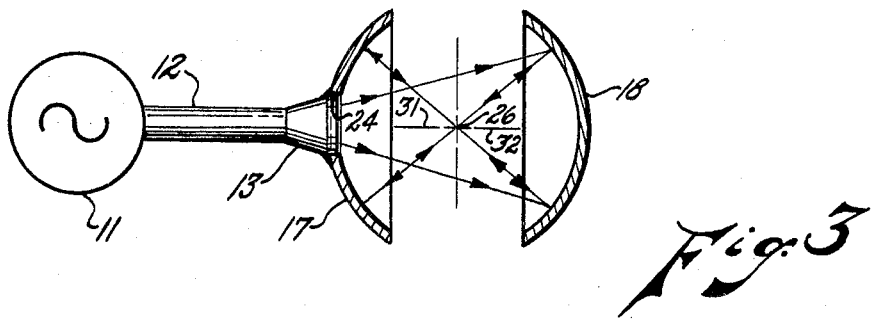
FIG. 3 illustrates another embodiment of this invention.

Now referring to FIG. 3, another arrangement is shown for achieving even a greater power density. Instead of causing the steady mode discussed above, a spherical wave front for energy passing in both directions can be conveniently formed. Such an arrangement utilizes axially-facing identical spherical reflectors 17 and 18 as shown in FIG. 3. Satisfactory operation for this embodiment requires that said spherical reflectors be spaced to have their center of radius 26 coincident, and the radius of each curvature 31 and 32 must be an integral number of half-wavelengths. The point of coincidence 26 is again the center of the region of maximum power density concentration.

From the above description, it will be recognized that the various objects of the invention have been achieved. The useable region of high R-F power density is considerably greater than that obtained in a closed transmission line system. Furthermore, since the system is physically open at the sides of the high power density level, the test specimen can be thrust into the field after power density built-up has occurred.

It will be obvious to those skilled in the art that changes and modifications may be made without departing from our invention in its raw aspects. For example, primary feed element 13 can be an electromagnetic horn, slot, dipole, etc., or an array of such elements coherently phased. Furthermore, it is not necessary to place element 13 at the vertex of paraboloid 14 as depicted; an array of elements could be distributed around the periphery of paraboloid 14 and thus eliminate the necessity of a hole in said paraboloid. Although this invention has been described with particular reference to paraboloid reflectors, the basic method is equally applicable to many other antenna configurations, including Cassegrainian reflectors and ellipsoidal reflectors. Furthermore, it is evident that even though the instant invention is most conveniently implemented at microwave frequencies, because of the availability and size of components, the method can be utilized outside the microwave frequency region as it applies to all electromagnetic wavelengths. Therefore, it is intended in the appended claims to cover all such modifications within the true spirit and scope of the invention.

We claim:
1. In an energy directing system utilizing a pair of reflective antenna elements positioned to form a free-space environment, the method of providing high R-F density in said environment comprising the step of: spacing said two antenna reflective elements in such manner that the focal points of said reflectors coincide at one central point, and have their respective focal distances arranged to conform to an integral number of half-wavelengths of the operating frequency, and the further step of connecting said pair of antenna elements to an exciting radio frequency mechanism to continuously supply power to said elements.

2. R-F traveling wave high power simulator apparatus comprising a coherent R-F power source, a transmission line connected to said power source, a feed element connected to the other end of said transmission line, a first and second paraboloidal reflector having a space region therebetween, said first reflector having hole at its vertex to allow radiation by said feed element to pass into the region between said reflectors, said reflectors disposed axially facing and separated such that the sum of the two respective focal distances is an integral number of half-wavelengths of the operating frequency to cause energy radiated in said space region to increase in magnitude in a steady state mode involving a plane electromagnetic wave being reflected from one paraboloid and a spherical electromagnetic wave being reflected from the other of said pair of paraboloids.

3. R-F traveling wave high power simulator apparatus comprising two substantially identical, electrically large, axially facing spherically reflecting antennas, said antennas having a coincident center of curvature and each of said antennas having a radius of curvature equal to an integral number of half-wavelengths of the operating frequency, means for continuously feeding coherent R-F energy in the space region between said antennas, said antennas causing said coherent electromagnetic R-F power to increase in magnitude in a steady state mode by repeatedly reflecting a spherical electromagnetic wave between said spherical reflectors.

No references cited.

HERMAN KARL SAALBACH, *Primary Examiner.*

R. F. HUNT, Jr., *Assistant Examiner.*